United States Patent
Roverso et al.

(10) Patent No.: US 9,578,077 B2
(45) Date of Patent: Feb. 21, 2017

(54) AGGRESSIVE PREFETCHING

(71) Applicant: Hive Streaming AB, Stockholm (SE)

(72) Inventors: Roberto Roverso, Stockholm (SE); Ricardo Reale, Stockholm (SE); Sameh El-Ansary, Stockholm (SE); Seif Haridi, Stockholm (SE)

(73) Assignee: Hive Streaming AB, Stockholm (SE)

( * ) Notice: Subject to any disclaimer, the term of this patent is extended or adjusted under 35 U.S.C. 154(b) by 229 days.

(21) Appl. No.: 14/063,851

(22) Filed: Oct. 25, 2013

(65) Prior Publication Data
US 2015/0120952 A1    Apr. 30, 2015

(51) Int. Cl.
*H04L 29/06* (2006.01)
*H04L 29/08* (2006.01)

(52) U.S. Cl.
CPC .......... *H04L 65/60* (2013.01); *H04L 65/4084* (2013.01); *H04L 65/80* (2013.01);
(Continued)

(58) Field of Classification Search
CPC ......... H04L 29/08306; H04L 29/08315; H04L 29/08324; H04L 29/08504; H04L 29/08513; H04L 67/104; H04L 67/1042; H04L 67/1044; H04L 67/108; H04L 67/1087; H04L 67/1089; H04L 29/06176; H04L 29/06387; H04L 29/06448; H04L 29/06462; H04L 29/06476; H04L 29/06517; H04L 29/06523; H04L 29/0836; H04L 29/08369; H04L 29/08396; H04L 29/08405; H04L 29/08423; H04L 29/0845; H04L 29/08459;
(Continued)

(56) References Cited

U.S. PATENT DOCUMENTS

2004/0236863 A1    11/2004   Shen et al.
2008/0205291 A1*   8/2008    Li ..................... H04L 12/5695
                                                             370/254
(Continued)

OTHER PUBLICATIONS

Lederer et al., "Towards Peer-Assisted Dynamic Adaptive Streaming over HTTP," IEEE 19th International Packet Video Workshop, May 2012, pp. 161-166.*

(Continued)

*Primary Examiner* — Vivek Srivastava
*Assistant Examiner* — William C McBeth
(74) *Attorney, Agent, or Firm* — Volpe and Koenig, P.C.

(57) ABSTRACT

A method is provided for distributing data content in a P2P live streaming network comprising a plurality of peers and a streaming source periodically producing segments representing the data content to be distributed, wherein a group of the peers are assigned to download the data content from the streaming source and to distribute the data content to remaining peers. The method comprises a first peer making requests for a current segment produced by the streaming source, the requests being made at a rate higher than a rate with which the segments are produced by the streaming source. If the first peer is the first to download the current segment, then the current segment has been downloaded, wherein the network peers can download the current segment from the first peer. Otherwise, a second peer downloads the current segment and it announces this to the group on the P2P network.

32 Claims, 7 Drawing Sheets

(52) U.S. Cl.
CPC ........ *H04L 67/108* (2013.01); *H04L 67/1042* (2013.01); *H04L 67/1068* (2013.01); *H04L 67/2847* (2013.01); *H04L 67/104* (2013.01); *H04L 67/1089* (2013.01)

(58) Field of Classification Search
CPC ......... H04L 29/08468; H04L 29/08477; H04L 29/08522; H04L 29/08531; H04L 29/08702; H04L 29/08729; H04L 29/08801; H04L 29/0881; H04L 65/4084; H04L 65/60; H04L 65/608; H04L 65/80; H04L 67/1061; H04L 67/1063; H04L 67/1068; H04L 67/1074; H04L 67/1076; H04L 67/1078; H04L 67/1091; H04L 67/1093; H04L 67/2842; H04L 67/2847; H04L 65/4069; H04L 65/4076; H04L 67/1085; H04N 21/643; H04N 21/647; H04N 21/658
USPC ....... 709/203, 217, 219, 223, 226, 230, 231, 709/201, 238, 244, 252
See application file for complete search history.

(56) References Cited

U.S. PATENT DOCUMENTS

| | | | | |
|---|---|---|---|---|
| 2009/0163189 | A1* | 6/2009 | Gil | G06F 17/30896 455/414.3 |
| 2010/0058405 | A1* | 3/2010 | Ramakrishnan | H04N 7/17318 725/97 |
| 2010/0098077 | A1* | 4/2010 | Oertel | H04L 67/1068 370/390 |
| 2011/0131278 | A1* | 6/2011 | Nieh | H04L 67/104 709/204 |
| 2011/0173265 | A1* | 7/2011 | Liang | H04N 7/17318 709/205 |
| 2011/0219114 | A1* | 9/2011 | Yang | H04L 29/12103 709/224 |
| 2011/0219137 | A1* | 9/2011 | Yang | H04L 29/12103 709/231 |
| 2011/0258322 | A1* | 10/2011 | Luzzatti | H04L 47/765 709/226 |
| 2012/0158818 | A1* | 6/2012 | Baduge | H04L 12/1854 709/201 |
| 2012/0210014 | A1* | 8/2012 | El-Beltagy | H04L 67/1044 709/231 |
| 2012/0297430 | A1* | 11/2012 | Morgos | H04L 65/4084 725/88 |
| 2013/0104247 | A1* | 4/2013 | Cakulev | H04L 67/1063 726/29 |
| 2013/0132602 | A1 | 5/2013 | El-Beltagy et al. | |
| 2013/0332621 | A1* | 12/2013 | Keller | H04L 65/60 709/231 |
| 2014/0025835 | A1* | 1/2014 | Gahm | H04N 21/2401 709/231 |
| 2014/0112120 | A1* | 4/2014 | Kim | H04N 21/643 370/216 |
| 2014/0289363 | A1* | 9/2014 | Sentinelli | H04L 1/00 709/217 |
| 2014/0325086 | A1* | 10/2014 | El-Beltagy | H04L 67/104 709/231 |
| 2015/0229685 | A1* | 8/2015 | Brebion | H04L 65/4076 709/202 |

OTHER PUBLICATIONS

Lu et al., "Scalable and Reliable Live Streaming Service through Coordinating CDN and P2P," IEEE 17th International Conference on Parallel and Distributed Systems, Dec. 2011, pp. 581-588.*

Mansy et al., "Analysis of Adaptive Streaming for Hybrid CDN/P2P Live Video Systems," 19th IEEE International Conference on Network Protocols, Oct. 2011, pp. 276-285.*

Roverso et al., "On the Feasibility of Centrally-Coordinated Peer-to-Peer Live Streaming," The 8th Annual IEEE Consumer Communication and Networking Conference, Jan. 2011, pp. 1061-1065.*

Roverso et al., "Peer2View a Peer-To-Peer HTTP Live Streaming platform," IEEE 12th International Conference on Peer-to-Peer Computing, Sep. 2012, pp. 65-66.*

Roverso et al., "SmoothCache: HTTP-Live Streaming Goes Peer-to-Peer," 11th International IFIP TC 6 Networking Conference, May 2012, pp. 29-43.*

Small et al., "Scaling Laws and Tradeoffs in Peer-to-Peer Live Multimedia Streaming," 14th Annual ACM International Conference on Multimedia, 2006, pp. 539-548.*

Bellavista et al., "Effective Epidemic Dissemination of Multimedia Metadata in Peer-to-Peer Overlay Networks: the Metis Architecture and Prototype", 2011 IEEE Symposium on Computers and Communications, Jun.-Jul. 2011, pp. 1073-1080.*

Hei et al., "IPTV over P2P Streaming Networks: The Mesh-Pull Approach", IEEE Communications Magazine, vol. 46, No. 2, Feb. 2008, pp. 86-92.*

Zhang et al., "CoolStreaming/DONet: A Data-Driven Overlay Network for Peer-to-Peer Live Media Streaming," Proceedings of the 24th Annual Joint Conference of the IEEE Computer and Communications Societies, Mar. 2005, pp. 2102-2111.*

* cited by examiner

AGGRESSIVE PREFETCHING

FIELD OF INVENTION

The invention relates to methods and devices of distributing data content in a live streaming peer-to-peer (P2P) network.

BACKGROUND

In recent years, Hypertext Transfer Protocols (HTTP) for streaming have become the de-facto standard for distribution of live and video-on-demand content over the Internet.

Peer-to-Peer live streaming (PLS) enables improving distribution efficiency for a given online live broadcast by having viewers of content contribute with their resources, namely bandwidth, to other viewers. Previous work in this area has proposed systems such as PPlive, CoolStreaming, T-bone, and more recently Bittorrent live. Peer-to-Peer (P2P) overlay construction for such applications falls mainly into two classes: tree-based and mesh-based systems. Although a consensus has not been reached on the best approach, mesh-based approaches have lately become more popular as they are more robust to peer churn, while tree-based overlays are more cumbersome to maintain in the same condition.

There is a recent trend of using HTTP-live streaming instead of the traditional Real Time Streaming Protocol/Real-time Transport Protocol (RTSP/RTP) for broadcast of live video content over the Internet. HTTP-live streaming consists of a set of protocols which all utilize the HTTP for transport. HTTP-live streaming changes the way a producer of the content (i.e. the streaming server) and a consumer of the content (i.e. the media player) interact.

Traditional streaming protocols such as the RTSP/RTP are based on a push-based model, where the player requests a certain stream and then the server pushes content over User Datagram Protocol (UDP) to the player controlling the speed of the delivery. HTTP-live streaming protocols are instead based on a pull-model, where it is the player that requests pieces of content over HTTP at the pace it deems suitable. On top of that, the HTTP-live protocols have been designed to support adaptive bitrate mode of operation, which avails the stream in a number of qualities. The choice of which quality to retrieve/reproduce is left to the player.

All major actors in the online broadcasting business have developed technologies which embrace HTTP-streaming and the concept of adaptive bitrate switching as a main approach for broadcasting. HTTP live has been adopted by content services and creators with support across all platforms and operating systems, including computers, tablets and smart phones. The shift from the push-based RTSP/RTP protocol to the pull-based HTTP-live protocols has rendered many of the established assumptions made in the current state-of-the art PLS obsolete. For all practical purposes, any new PLS algorithm, irrespective of its theoretical soundness, will not be deployable if it does not take into account the realities of the mainstream broadcasting ecosystem around it. Currently, both the Content Delivery Networks (CDNs) and the live streaming solution vendors are focusing on HTTP-based solutions.

SUMMARY

An object of the present invention is to solve or at least mitigate these problems in the art and to provide an improved method and device of distributing data content in a P2P live streaming network.

This object is attained in a first aspect of the present invention by a method of distributing data content in a P2P live streaming network comprising a plurality of peers and a streaming source periodically producing segments representing the data content to be distributed, wherein a group of the peers are assigned to download the data content from the streaming source and to distribute the downloaded data content to remaining peers in the P2P network. The method comprises making requests, from a first peer comprised in the group, for a current segment produced by the streaming source, the requests being made at a rate higher than a rate with which the segments are produced by the streaming source. Further, the method comprises announcing, if the first peer is the peer in the group being the first to download the current segment, that the current segment has been downloaded, wherein the network peers can download the current segment from said first peer; or else downloading the current segment from a second peer in the group being the first to download the current segment, which second peer announces the download of the current segment on the P2P network.

This object is attained in a second aspect of the present invention by a method of arranging peers in a P2P live streaming network comprising a plurality of peers and a streaming source arranged to distribute data content, which streaming source periodically produces segments representing the data content to be distributed. The method comprises assigning a group of the peers to download the data content from the streaming source and to distribute the downloaded data content to remaining peers in the P2P network. Further, the method comprises instructing each peer in the group of peers to make requests for a current segment produced by the streaming source, the requests being made at a rate higher than a rate with which the segments are produced by the streaming source. Moreover, the method comprises instructing a peer in the group being the first to download the current segment to announce on the P2P network that the current segment has been downloaded, wherein the network peers can download the current segment from the peer in the group being the first to download the current segment, said peers comprised in the group further being instructed to download the current segment from the peer in the group being the first to download the current segment.

Further provided is a peer device of the first aspect of the present invention for distributing data content in a P2P live streaming network comprising a plurality of peers and a streaming source periodically producing segments representing the data content to be distributed, wherein a group of the peers are assigned to download the data content from the streaming source and to distribute the downloaded data content to remaining peers in the P2P network. The peer device comprises a processing unit being arranged to make requests for a current segment produced by the streaming source, the requests being made at a rate higher than a rate with which the segments are produced by the streaming source, and to announce, if the peer device is the peer in the group being the first to download the current segment, that the current segment has been downloaded, wherein the network peers can download the current segment from the peer device or else to download the current segment from another peer in the group being the first to download the current segment, said another peer announcing the download of the current segment on the P2P network.

Further provided is a network supervision device of the second aspect of the present invention for arranging peers in a P2P live streaming network comprising a plurality of peers and a streaming source arranged to distribute data content, which streaming source periodically produces segments representing the data content to be distributed. The network supervision device comprises a processing unit being arranged to assign a group of the peers to download the data content from the streaming source and to distribute the downloaded data content to remaining peers in the P2P network. Further, the processing unit is arranged to instruct each peer in the group of peers to make requests for a current segment produced by the streaming source, the requests being made at a rate higher than a rate with which the segments are produced by the streaming source, and to instruct a peer in the group being the first to download the current segment to announce on the P2P network that the current segment has been downloaded, wherein the network peers can download the current segment from the peer in the group being the first to download the current segment. Moreover, the processing unit is arranged to instruct the peers comprised in the group to download the current segment from the peer in the group being the first to download the current segment.

Advantageously, the present invention proposes a pre-fetching approach which allows an additional buffer to be built between the player and the source of the stream, but without introducing further playback delay with respect to a CDN-based solution. Thus, a group of peers are assigned to download data content from the streaming source and to distribute the downloaded data content to remaining peers in the P2P network, and are further arranged to share downloaded data segments among each other. The request approach proposed by the present invention is more aggressive than pre-fetching employed in the art. This more aggressive approach implies that the requests of the group of peers assigned to download from the source, the $1^{st}$ tier peers, are made at a rate higher than the rate with which the segments are produced by the streaming source. Advantageously, this will reduce the delay with which a peer is able to render a downloaded data segment with respect to the live playback point of the source.

Hence, the $1^{st}$ tier peers repeatedly make requests for a current data segment before it is produced by the streaming source. As soon as any one of the $1^{st}$ tier peers downloads the current data segment, it will make an announcement on the P2P network that it has access to the current data segment, and the other network peers—including the other $1^{st}$ tier peers—can fetch the current data segment from the downloading $1^{st}$ tier peer, thus advantageously avoiding further load on the source of a data segment already being downloaded by a $1^{st}$ tier peer. This will greatly improve source savings in the P2P network. The announcement will further have the advantage that peers not being comprised in the group which are assigned to download directly from the source, also referred to as $2^{nd}$ tier peers, do not have to repeatedly make requests to the $1^{st}$ tier peers, but can await an announcement of a current data segment before they make a request for it.

Various embodiments of the present invention is defined by the dependent claims and will be discussed in detail in the following.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION OF THE PREFERRED EMBODIMENTS

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

In the following, reference is made to FIGS. 1-3 for a discussion of various prior art methods of distributing data content in a P2P network.

Figure 1:
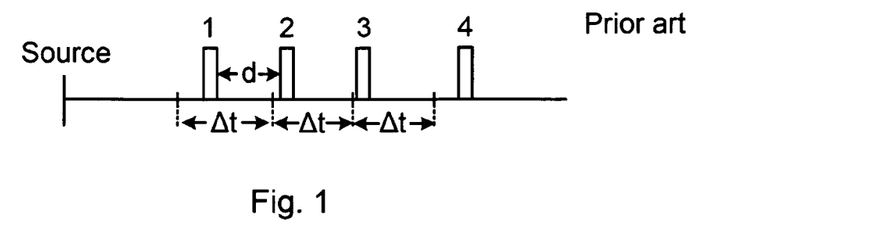
FIG. 1 illustrates downloading in a network utilizing a traditional client-server approach of distribution data content.

FIG. 1 illustrates downloading in a network utilizing a traditional client-server approach of distribution data content, i.e. a network not implementing P2P sharing of data content among clients in the network. The spikes in the diagram represent data content segments 1, 2, 3 and 4 produced by the server (i.e. the source) along a timeline at a predetermined interval $\Delta t$. Thus, if it has been determined in the network that the source will produce the segments with the interval $\Delta t$, the most straightforward solution would be to have the client request data segments with the same interval Δt; the requests of the client are represented by the points along the timeline. Depending on how the requests are synchronized with the production of segments at the source, the client downloads the produced segments with a longer or shorter delay d. The major downside of the traditional client-server approach is that source load is substantial since all clients in the network will request data from the source.

It should be noted that the segments not necessarily is produced with a fixed predetermined interval Δt, but could be produced with an irregular interval. However, for the sake of illustration, these prior art examples uses a fixed predetermined interval Δt.

Figure 2A:
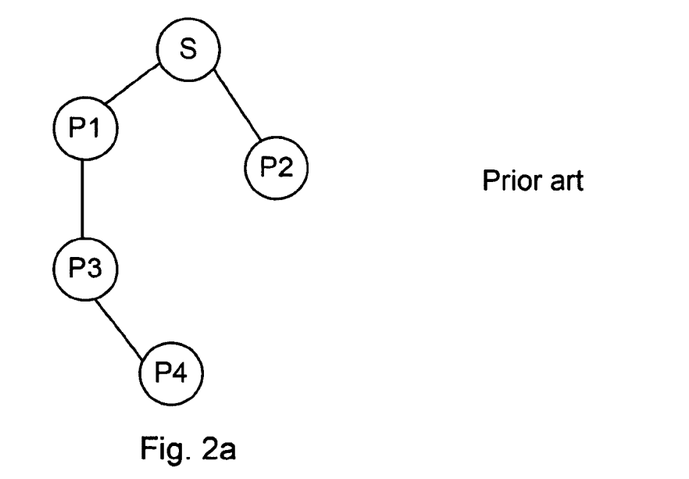
FIG. 2a illustrates downloading in a prior art P2P network.

FIG. 2a illustrates downloading in a prior art P2P network, where two peers P1 and P2 are arranged to download data content from a streaming source S and distribute the downloaded data content to remaining P2P network peers arranged further from the source than the peers P1 and P2. FIG. 2b shows a time diagram illustrating downloading of the data content. Again, the spikes in the diagram represent data content segments 1, 2, 3 and 4 produced by the streaming source along a timeline at a predetermined interval Δt. The two peers P1 and P2 request data segments with the same interval Δt. As is illustrated in FIG. 2b, each peer request is made with a different delay from when the segment is produced at the source. For example, in the time diagram it is clear that $Ts(1)<Tp2(1)<Tp1(1)$. That is, the second peer P2 requests segment 1 at "$Tp2(1)$" just after segment 1 is produced by the source, at time "$Ts(1)$", but the first peer P1 requests the same segment later in time at "$Tp1(1)$", i.e. just before segment 2 is produced.

Figure 2B:
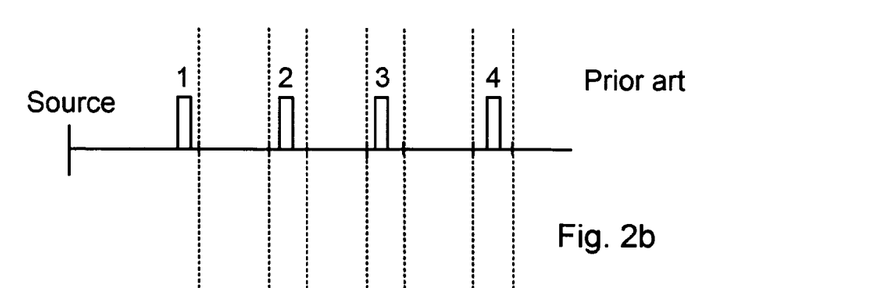
FIG. 2b illustrates that each peer request in FIG. 2a is made with a different delay from when the segment is produced at the source.
Figure 3:
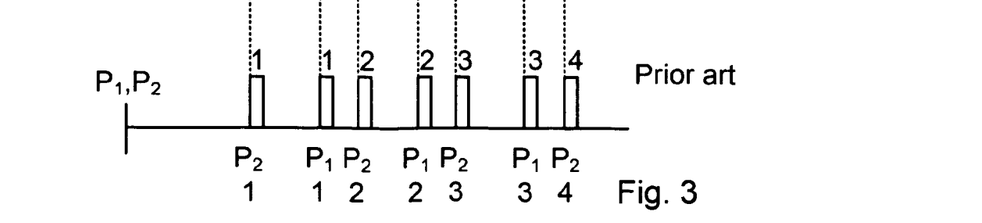
FIG. 3 shows the timing of the actual downloading of segments as a result of the request procedure of FIG. 2b.

FIG. 3 shows the timing of the actual downloading of segments as a result of the request procedure of FIG. 2b. As can be seen in FIG. 3, the second peer P2 is constantly ahead of the first peer P1 in downloading the data segments; the second peer P2 downloads segment 2 just after the first peer P1 has downloaded segment 1, and so on. The peers P1 and P2 will subsequently share the downloaded data segments with other peers in the P2P network. As can be seen, the delay with which a downloading peer will be able to render the data content depends on when the peers P1 and P2 turns to the source for produced data segments. As, illustrated in FIG. 3, the second peer P2 will always be able to render a current data segment before the first peer P1 due to this delay. If Δt is assumed to be for instance 1 s, the first peer P1 will (with reference to FIG. 2b) lag the second peer P2 with about 0.6 s, and the source with approximately 0.8 s.

With reference to FIGS. 2a and b, if a third peer P3 not being comprised in the group which are assigned to download directly from the source (i.e. the group consisting of P1 and P2), will try to download a current data segment from the first peer P1, the third peer P3 will be even further removed from the live playback point of the source. Assuming that the third peer P3 requests data content with Δt and lags the first peer P1 in time with 0.5 s, the delay from the live playback point will be 0.8+0.5=1.3 s. As can be concluded, this two-step "pull" approach (i.e. Source→P1→P3) may result in great delays from the live playback point. This is even more evident further downstream from the source, where a fourth peer P4 may download from the third peer P3, thus injecting a further request step in the distribution chain with a resulting further delay.

Figure 4A:
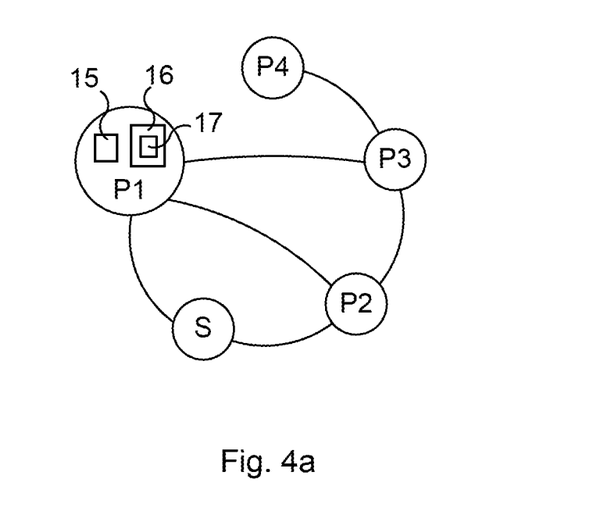
FIG. 4a illustrates distribution of data content in a P2P network according to an embodiment of the present invention.
Figure 4B:
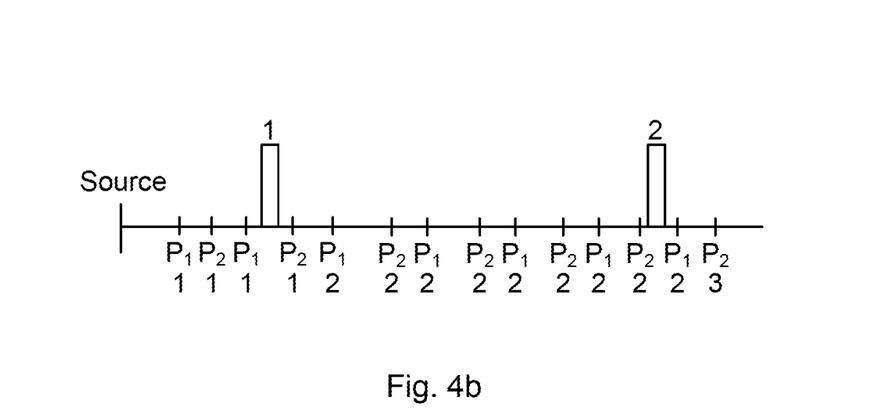
FIG. 4b illustrates two peers taking turns at making requests to a streaming source according to an embodiment of the present invention.

FIGS. 4a and b illustrate an embodiment of the present invention, where the group of peers (in this exemplifying embodiment P1 and P2) assigned to download the data content from the streaming source and to distribute the downloaded data content to remaining peers in the P2P network further are arranged to share downloaded data segments among each other. Moreover, the request approach is more aggressive than that of the previously described prior art.

This more aggressive approach implies that the requests of the group of peers assigned to download from the source, the $1^{st}$ tier peers, are made at a rate higher than the rate with which the segments are produced by the streaming source. Hence, the intervals with which the requests are made are smaller than Δt. Advantageously, this will reduce the delay with which a peer is able to render a downloaded data segment with respect to the live playback point of the source.

As can be seen in FIG. 4b, the first peer P1 makes a first request for a current data segment, i.e. segment 1, before it is produced by the streaming source. Thereafter, the second peer P2 makes a first request for segment 1 before the first peer P1 makes a second request for segment 1. Just after the source produces the first segment 1, the second peer P2 makes its second request and successfully downloads segment 1. The second peer P2—being the first of the $1^{st}$ tier peers—will make an announcement on the P2P network that it has segment 1, and the first peer P1 will as a consequence no longer request segment 1 from the source, but fetch segment 1 from the second peer P2, thus advantageously avoiding further load on the source of a data segment already being downloaded by another $1^{st}$ tier peer. This will greatly improve source savings in the P2P network. The announcement will further have the advantage that peers not being comprised in the group which are assigned to download directly from the source, also referred to as $2^{nd}$ tier peers to which peers e.g. the third peer P3 belongs, does not have to repeatedly make requests to the $1^{st}$ tier peers, but can await an announcement of a current data segment before they make a request for it.

The announcement can be made for instance in a manifest file to which all the network peers and the streaming source commonly have access, which manifest file thus will indicate on which peer device(s) segment(s) can be found, or a peer may alternatively broadcast an announcement to remaining or immediately connected network peers.

Hence, as is illustrated in FIG. 4b, the third request of the first peer P1 will not be for data segment 1 already downloaded by the second peer P2 and announced on the network, but for the new current data segment 2. The peers P1 and P2 aggressively makes another nine requests for data segment 2 before the first peer P1 successfully downloads data segment 2 on its sixth request just after the streaming source has produced it, and makes an announcement accordingly on the P2P network.

The next request of the second peer P2 will as a result of the announcement not be for data segment 2, which the second peer P2 fetches from the first peer P1, but for new current data segment 3 (not shown). A third peer P3 not being comprised in the group which are assigned to download directly from the source (i.e. the group consisting of P1 and P2), can upon announcement of a currently downloaded segment turn to the $1^{st}$ tier peers which will upload the segments to the third peer P3; the first data segment 1 is downloaded from the second peer P2 while the second data segment 2 is downloaded from the first peer P1, for instance. Thus, in contrast to the prior art approach discussed in FIG. 3, the third peer will in the present invention advantageously have access to the first data segment 1 within fractions of a second, say 0.3-0.4 s from the live playback point, as compared to the example of the prior art where the delay would amount to about 1.3 s. Further, even though a fourth peer P4 would choose to download from the third peer P3 instead of any one of the 1$^{st}$ tier peers, the delay would still only be a another couple of tenths of a second from that of the third peer P3, making the delay from the live playback point of the source around 0.5-0.6 s for the fourth peer P4 in this particular exemplifying embodiment.

Typically, at each peer device in the network, being e.g. a television set, a mobile phone, a computer, a tablet, etc., there is client installed, referred to in the following as a PLS agent, which typically is a piece of software implemented at the peer device running a number of helper services. With the PLS agent, the present invention is designed to be transparent to already-existing streaming infrastructure in order to ensure both vendor neutrality as well as simplified deployment. Thus, as has been described in the above, upon a content segment request from a player running on a peer device, such as for instance a media player running on a tablet, the PLS agent tries to timely retrieve the data requested from other peers in the overlay. However, if a segment cannot be retrieved from any other peer on time, the PLS agent will attempt to download the segment from the source of the stream, i.e. a streaming server or a hardware CDN. By falling back to the source, it can be guaranteed that all segments are delivered on time even if the peers of the overlay network cannot retrieve such segments, thereby guaranteeing a desired level of Quality of Experience (QoE). With respect to terminology, "peers" and "peer devices" will alternately be used for denoting a network node desiring to render data content streamed by the source.

Again with reference to FIG. 4a, each peer device in the network, being e.g. a television set, a mobile phone, a computer, a tablet, etc. In practice, the functionality of a peer device such as P1, including the before mentioned PLS agent, is accomplished by a processing unit 15 embodied in the form of one or more microprocessors arranged to execute a computer program 17 downloaded to a suitable storage medium 16 associated with the microprocessor, such as a Random Access Memory (RAM), a Flash memory or a hard disk drive. The processing unit 15 is arranged to carry out the method according to embodiments of the first aspect of the present invention when the appropriate computer program 17 comprising computer-executable instructions is downloaded to the storage medium 16 and executed by the processing unit 15. The storage medium 16 may also be a computer program product comprising the computer program 17. Alternatively, the computer program 17 may be transferred to the storage medium 16 by means of a suitable computer program product, such as a floppy disk or a memory stick. As a further alternative, the computer program 17 may be downloaded to the storage medium 16 over a network. The processing unit 15 may alternatively be embodied in the form of a digital signal processor (DSP), an application specific integrated circuit (ASIC), a field-programmable gate array (FPGA), a complex programmable logic device (CPLD), etc.

Figure 5:
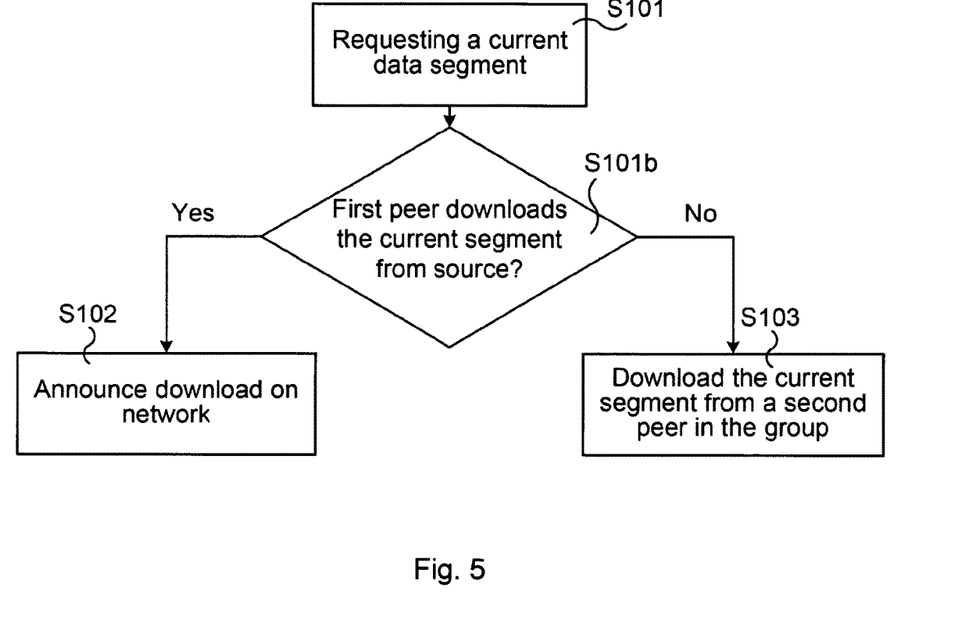
FIG. 5 illustrates a flowchart of an embodiment of a method according to a first aspect of the present invention undertaken by a peer device.

FIG. 5 illustrates a flowchart of an embodiment of a method according to a first aspect of the present invention, as undertaken at a 1st tier peer device, for instance the peer device P1 of FIG. 4a. In a first step, S101, the processing unit 15 of the peer device P1 makes a request to the streaming source S for a current segment of a desired data content. As previously has been discussed, an aggressive pre-fetching approach undertaken by the 1st tier peers is proposed where the requests are being made at a rate which is higher than the rate with which the segments are produced by the streaming source S. In a second step S101b, if the processing unit 15 of peer device P1 is the first peer in the group of 1st tier peers (the other peer being peer device P2 in this example) to download the requested current segment, the processing unit 15 of peer device P1 will make an announcement on the network, at step S102, that the current segment has been downloaded, wherein the network peers can download the current segment from the first peer device P1, if desired, instead of turning to the streaming source S. Thus, the other peer devices in the group of 1st tier peers can discontinue their requesting for the current segment to the streaming source S. Thus, peer device P2 will turn to peer device P1 for the current segment thereby avoiding a further load on the streaming source S. However, in step S103, should the other peer device P2 be the first peer in the group of 1st tier peers to download the current segment from the streaming source S, peer device P2 will announce the download of the current segment on the P2P network, whereby the processing unit 15 of peer device P1 discontinues its requesting of the current segment from the streaming source and fetches if from the second peer device P2 instead.

Now, as previously has been discussed, the streaming source produces segments of data content at regular ($\Delta t$) or irregular intervals. For network coordinating reasons, the segments may be published in a manifest file to which at least the 1$^{st}$ tier peers have access. At any point in time, if the latest published segment, i.e. the current segment, in the manifest is i−1, it is possible that segment i has been produced and may be available for download but will not be published in the manifest file for another $\mu$ time units. The group of peers comprised in the 1$^{st}$ tier peers will attempt to retrieve segment i, but if the source responds with a negative answer about the availability of the next current data segment i, the prefetching is in an embodiment of the present invention rescheduled to occur after a period of time $0<T_{resc}<\delta$, where $\delta$ denotes length of a segment. In a further embodiment of the present invention, the rescheduling period Tresc is configured to be random. The randomness is advantageously employed to allow time for the source to generate a segment and to create asynchrony between all the pre-fetching 1$^{st}$ tier peers waiting for the segment to become available. While this rescheduling is in place, another 1$^{st}$ tier peer might retrieve the segment first and announce it and in that case the remaining 1$^{st}$ tier peers will download from the 1$^{st}$ tier peer that retrieved the segment, as has been illustrated hereinabove.

The manifest file thus comprises the published segments, and possibly a timestamp and a bitrate for identifying the respective segment. Further, the manifest file may comprise a segment index indicating on which peer device(s) the segment(s) can be found.

On all peer devices, the PLS agent arranged to pre-fetch data segments runs in parallel with the peer device player and tries to populate a peer device segment cache with upcoming segments, optionally of a same bitrate the player is requesting (as will be discussed), before they are actually requested by the latter. The PLS agent retrieves segments exclusively from the overlay and does so upon receipt of announcements of downloaded segments from network peer devices. The idea is to advantageously increase the utilization of the P2P network and decrease the risk of failing to fetch a segment in time when requested by the player.

In the following, overlay construction of the P2P network will be described according to embodiments of the present invention. The 1$^{st}$ tier construction process is responsible for deciding on the group of peers which can contribute their bandwidth to the 2$^{nd}$ tier peers, and is typically undertaken by a network device known as a tracker, being a network supervising device employed to coordinate the peers in the P2P network. This group of peers should be sufficiently large to provision the $2^{nd}$ tier peers, thus avoiding the need for the $2^{nd}$ tier peers to fall back on the source for downloading data content, but on the other hand not too large as to create unnecessary load on the source of the stream. It should be noted that in a network having restrictions, such as e.g. firewalls, a requirement for becoming an eligible first tier candidate may be that the peer is an open Internet node or behind a Network Address Translation (NAT) that is easily traversable. A requirement to be stipulated for a peer to be assigned to the $1^{st}$ tier peers is that it has a sufficiently high upload capacity. In an embodiment, the upload capacity of a peer to be assigned to the $1^{st}$ tier is that its upload capacity exceeds a predetermined threshold value.

It should be noted that once the peers are arranged in the P2P network (or prior to being arranged in the network), the peers will need configuration data in order to know how to behave according to the network policy, e.g. which peers are $1^{st}$ tier peers, which peers are $2^{nd}$ tier peers, and how are the peers going to make their requests. This configuration data is typically provided to the network peers by the tracker to be downloaded and executed on the respective network peer. Thus, once the configuration data is uploaded to the respective network peer and the peers behave in accordance with the current P2P network policy, the tracker generally does not have to instruct the peers how to behave, unless changes are made to the network such as for instance a $2^{nd}$ tier peer being assigned to the $1^{st}$ tier.

Figure 6A:
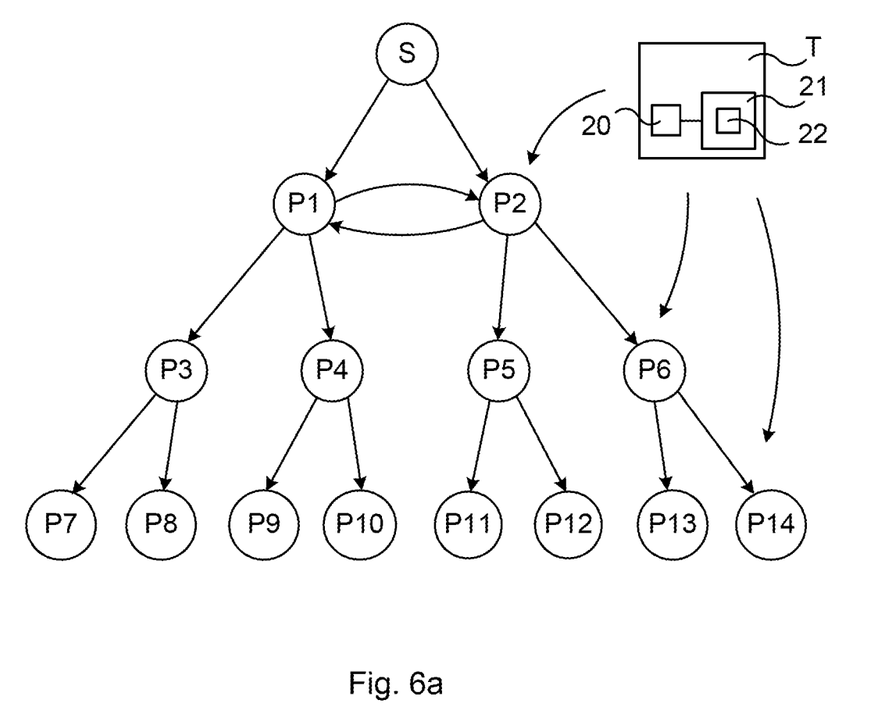
FIG. 6a illustrates a tracker device configured to arrange peers in a P2P live streaming network comprising a streaming source according to an embodiment of a second aspect of the present invention.

FIG. 6a illustrates a tracker device T configured to arrange peers P1-P14 in a P2P live streaming network comprising a streaming source S according to an embodiment of a second aspect of the present invention. Such arrangement may take the form of a tree-like structure (as shown) or a more arbitrary mesh structure with certain connectivity biases among the peers. Similar to the peer device P1 discussed in connection to FIG. 5, the method according to the second aspect of the present invention carried out by the tracker T is accomplished by a processing unit 20 embodied in the form of one or more microprocessors arranged to execute a computer program 22 downloaded to a suitable storage medium 21 associated with the microprocessor.

Figure 6B:
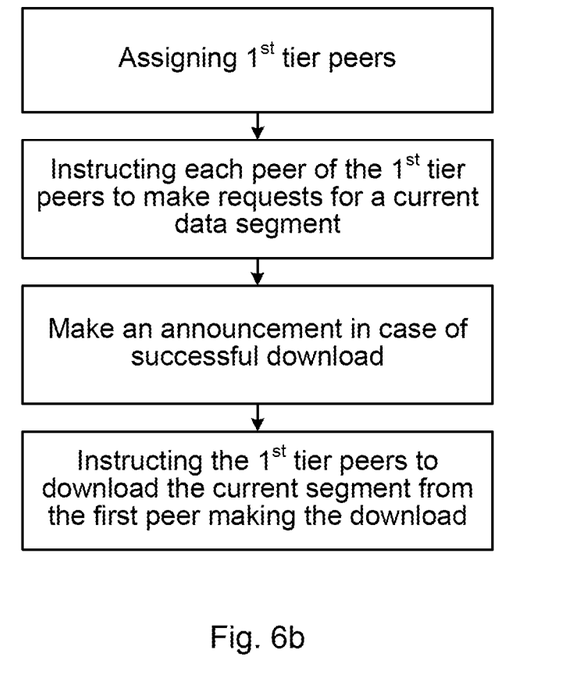
FIG. 6b illustrates a flowchart of an embodiment of a method of arranging peers in a P2P network according to a second aspect of the present invention undertaken by a tracker device.

FIG. 6b illustrates a flowchart of an embodiment of a method of arranging peers in a P2P network according to a second aspect of the present invention, as undertaken by a network supervising device, for instance the tracker device T of FIG. 6a (to which reference is made in the following when discussing the flowchart of FIG. 6b). In a first step, S201, the processing unit 20 of the tracker device T assigns a group of peers P1, P2 to download data content from a streaming source S and to distribute the downloaded data content to remaining peers in the P2P network. In a second step S202, these $1^{st}$ tier peers are instructed by the processing unit 20 of the tracker T to use an aggressive pre-fetching approach where requests for a current data segment representing the data content are being made at a rate which is higher than the rate with which the segments are produced by the streaming source S.

In a third step S203, the processing unit 20 of the tracker device T instructs the peer in the $1^{st}$ tier peer group being the first to download the current segment to announce on the P2P network that the current segment has been downloaded, wherein the network peers can download the current segment from the peer in the group being the first to download the current segment. Further, in step S204, the peers comprised in the group of $1^{st}$ tier peers are instructed to download the current segment from the peer in the group being the first to download the current segment.

In case of data content being distributed from the streaming source as a multi-bitrate data stream, peer devices rendering data content at different bitrates will be categorized as belonging to different overlays in the P2P network. Hence, peers rendering a stream having a first bitrate are considered to be comprised in an overlay separate from peers rendering a stream of a second bitrate, and a $1^{st}$ tier peer group is created for each streaming bitrate. First tier peers are chosen from the "best" peers in the system, namely the ones with the highest upload capacity, regardless of the bitrate they are rendering. This is because the pre-fetcher component residing on each peer (i.e. the PLS agent) is able to retrieve data content having other bitrates than that of the data content currently rendered by the peer. This embodiment is particularly convenient as more powerful peers can, at all times, be used to supply peers rendering data content at a lower bitrate and therefore increase savings levels.

In a further embodiment, the number of pre-fetching bitrates is limited to one for each of the $1^{st}$ tier peers, in order to advantageously avoid utilizing too much bandwidth and computational resources on powerful peers.

As can be concluded from the above, multi-bitrate support can be achieved by arranging the P2P network in different overlays for different bitrates. That is, given the "best" network peers in terms of upload capacity, a subset of these peers may be promoted as $1^{st}$ tier peers for each bitrate in the network, independently from the bitrate of the data content the promoted peers are rendering. Promoted peers for a certain bitrate, i.e. for a certain overlay, may optionally be excluded from being selected as $1^{st}$ tier peers for another bitrate.

In an embodiment of the present invention, the tracker-assisted process of determining the $1^{st}$ tier peers of the P2P network will be undertaken as described in the following. The tracker keeps a list L of all peers in the network. In addition to that, the tracker categorizes peers in different lists L(bn) according to the bitrate bn of the data content that the respective peer is rendering. Then, both L and all L(bn) are ordered according to the effective upload capacity of the peers, which may be estimated as $u(p)=\min(u_{max}(p), O*b(p))$ for each peer p, where $u_{max}(p)$ is the maximal estimated bandwidth of peer p, O is its the maximum number of outgoing connections and b(p) is the bitrate of the data content that peer p is rendering.

Figure 7:
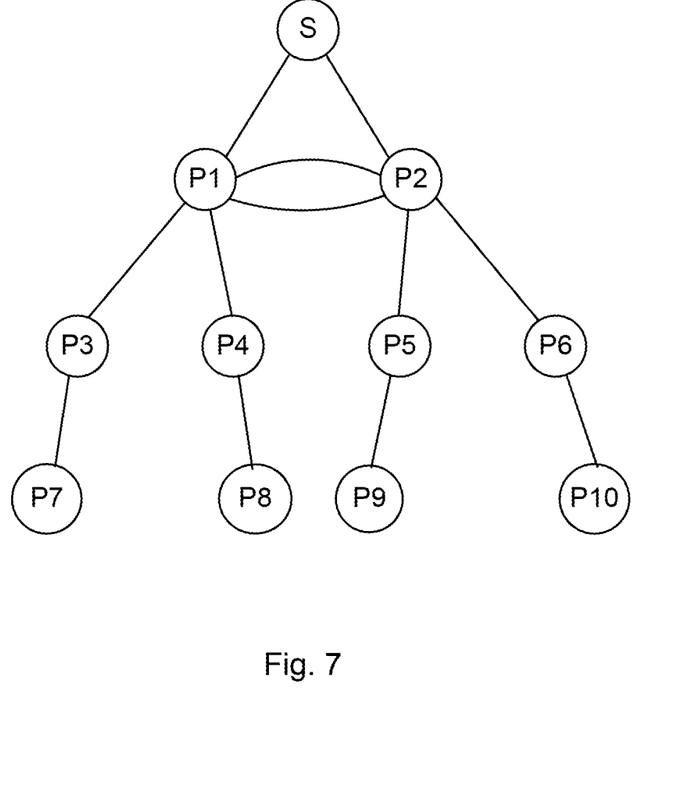
FIG. 7 illustrates arranging of peers in a P2P network according to an embodiment of the method of the second aspect of the present invention.

This embodiment will be further exemplified with reference to FIG. 7 and Table 1 given in the following. It should be noted that the example of FIG. 7 also could be used in case multi-rate streaming is not employed in the P2P network.

TABLE 1

| Peer no. | Upload capacity (u) | Bitrate (bn) |
|---|---|---|
| P1 | 100 kb/s | — |
| P2 | 100 kb/s | — |
| P3 | 50 kb/s | 50 kb/s |
| P4 | 50 kb/s | 50 kb/s |
| P5 | 50 kb/s | 50 kb/s |
| P6 | 50 kb/s | 50 kb/s |
| P7 | 25 kb/s | 50 kb/s |
| P8 | 25 kb/s | 50 kb/s |
| P9 | 25 kb/s | 50 kb/s |
| P10 | 25 kb/s | 50 kb/s |

Periodically, the tracker runs the following tier assignment algorithm. It picks the best peer c (in this particular example P1 or P2) from the list L and adds it in the set of $1^{st}$ tier peers FT(b1) in the P2P network, where b1 is the highest bitrate data content. In FIG. 7, peer P1 is selected among all peers in the network to be included in FT(50 kb/s). Then, the tracker starts assigning $2^{nd}$ tier peers by adding the highest ranked peers from the set L(b1)–FT(b1), i.e. the peers with the particular bitrate but with the assigned $1^{st}$ tier peers omitted. In this case, the highest ranked peers in terms of upload capacity for the selected bitrate of 50 kb/s are peers P3-P6. Once the cumulative upload capacity $U_{r1}$ of the $1^{st}$ tier peers is depleted, in this case $U_{r1}=u(c)$ since only one single $1^{st}$ tier peer P1 is placed in the overlay, it starts adding peers to the $2^{nd}$ tier, the $2^{nd}$ pier being all remaining peers not comprised among the $1^{st}$ tier peers by adding as many peers as can be provided for (limited by $U_{r2}$, i.e. the cumulative upload capacity of these peers added to the $2^{nd}$ tier). Thus, only two of the peers P3-P6 can be provided for by $1^{st}$ tier peer P1, and peers P3 and P4 are consequently placed downstream of the streaming source S. Thereafter, the next order peers P7-P10 in terms of upload capacity are considered; however, only two of them can be connected to the peers P3, P4 due to the cumulative upload capacity $U_{r2}$, in this particular example peers P7 and P8. It should be noted that all network peers except for the $1^{st}$ tier peers are considered $2^{nd}$ tier peers, regardless of how far downstream of the source S they are placed. The download capacity required by a peer is equal to the bitrate b of the data content it is rendering. The process is repeated until all peers in the list L(b1) have been assigned; if not all peers in the list L(b1) have been assigned in the P2P network, the procedure may have to be re-started by adding peers to the set of $1^{st}$ tier peers FT(b1). The algorithm repeats until all peers in L(b1) have been assigned in the overlay. Thus, the tracker picks a next best peer from the list of network peers, in this case peer P2 having the same upload capacity as peer P1, and adds it to the set of $1^{st}$ tier peers FT(b1). In analogy with the previous description, peers P5 and P6 are added, while peers P9 and P10 are connected to P5 and P6. Thus, all peers in list L(50 kb/s) has been arranged in the P2P network, and two peers P1 and P2 has been included in FT(50 kb/s). As can be seen in FIG. 7, the $1^{st}$ tier peers are arranged to share data segments with each other as previously has been described. For illustrative purposes, in the P2P network of FIG. 7, peers comprised among the $2^{nd}$ tier peers, i.e. peers P3-P10, are not shown to share content among each other (other than P3 sharing to P7, P4 to P8, P5 to P9 and P6 to P10). However, in a practical case. Peers P3-P6 are likely to share content among each other as well as to peers P7-P10 (other than the connections outlined in FIG. 7), and peers P7-P10 could download content from the $1^{st}$ tier peers P1 and P2, in a mesh-like structure. The same holds for FIG. 8 in the following.

After the algorithm terminates for L(b1) and the output set FT(b1) is provided, the tracker removes all peers included in the $1^{st}$ tier peer set FT(b1) from the list L, so as to prevent that powerful peers pertaining to bitrate b1 are reused as pre-fetchers for other bitrates. Then the tracker repeats the procedure for L(b2), L(b3), etc. The peers belonging to any $1^{st}$ tier set FT(bn) receive a command to enable their pre-fetcher implemented by the respective PLS agent on bitrate bn. Another embodiment will be exemplified with reference to FIG. 8 and Table 2 given in the following. This embodiment illustrates the arranging of peers in different overlays in case of multi-rate streaming is employed in the P2P network.

TABLE 2

| Peer no. | Upload capacity (u) | Bitrate (bn) |
|---|---|---|
| P1 | 100 kb/s | — |
| P2 | 100 kb/s | — |
| P3 | 50 kb/s | 50 kb/s |
| P4 | 50 kb/s | 50 kb/s |
| P5 | 50 kb/s | 50 kb/s |
| P6 | 50 kb/s | 50 kb/s |
| P7 | 25 kb/s | 25 kb/s |
| P8 | 25 kb/s | 25 kb/s |
| P9 | 25 kb/s | 25 kb/s |
| P10 | 25 kb/s | 25 kb/s |
| P11 | 25 kb/s | 25 kb/s |
| P12 | 25 kb/s | 25 kb/s |
| P13 | 12.5 kb/s | 25 kb/s |
| P14 | 12.5 kb/s | 25 kb/s |

Figure 8:
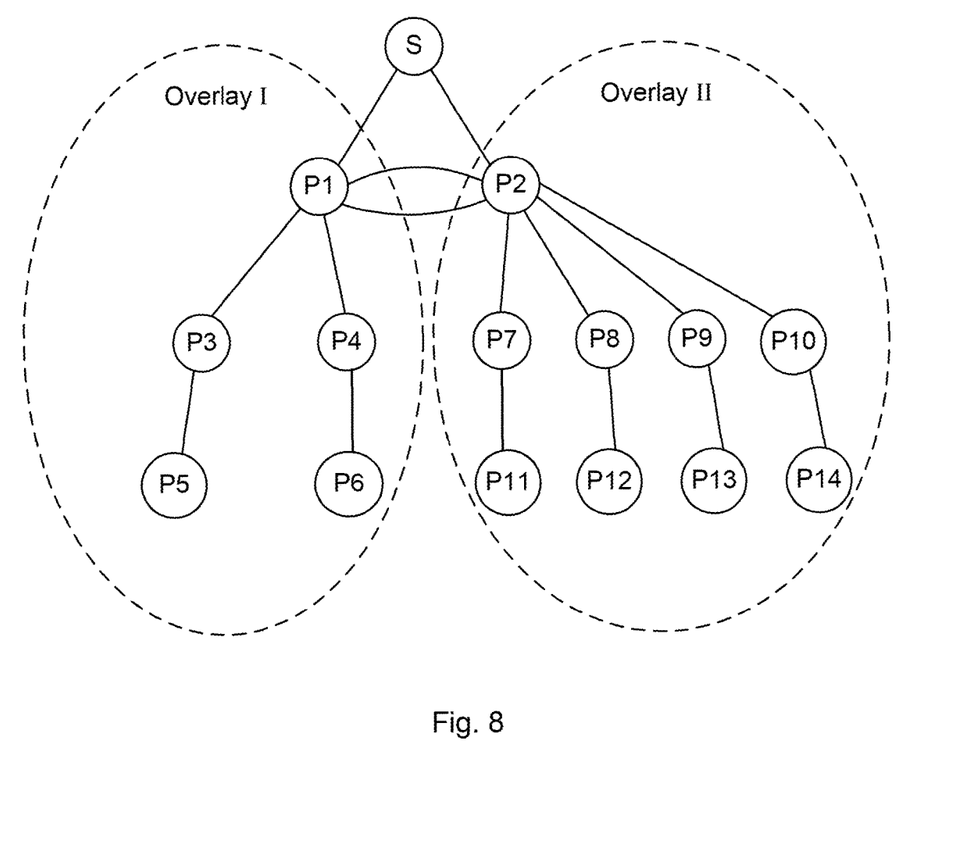
FIG. 8 illustrates arranging of peers in a P2P network according to another embodiment of the method of the second aspect of the present invention.

Again, the tracker runs the following overlay construction algorithm. It picks the best peer c (in this particular example P1 or P2) from the list L and adds it in the set of $1^{st}$ tier peers FT(b1) of the P2P network, where b1 is the highest bitrate data content, in this case 50 kb/s. In FIG. 8, peer P1 is selected among all peers in the network to be included in FT(50 kb/s). Then, the tracker starts building the $2^{nd}$ tier group by adding the highest ranked peers from L(b1), and so on as discussed in connection to FIG. 7. After peers P5 and P6 have been arranged, a first overlay has been created for b1=50 kb/s since all peers in the list L(b1) have been assigned. Thereafter, the tracker picks a next best peer from the list of network peers, in this case peer P2 having the same upload capacity as peer P1, and adds it to the set of $1^{st}$ tier peers FT(b2) of the second overlay of the P2P network. In analogy with the previous description, peers P7-P10 are added closer to the source S, while peers P10-P14 are arranged further downstream of the source S considering the cumulative upload capacity of the peers. Thus, all peers in list L(25 kb/s) has been arranged in the P2P network. As can be seen in FIG. 7, the $1^{st}$ tier peers of the two different overlays may be arranged to share data segments with each other as previously has been described, even though it can be envisaged that the two created overlays are held completely separate from each other.

As is clear from the above, in order for the tracker to be able to arrange the peer devices in the P2P network, the tracker will need knowledge about the upload capacity of the respective peer (and possibly the download demand of each respective peer). Thus, when a peer device joins the P2P network, the peer device may have to report its upload capacity (and optionally its download demand) to the tracker, possibly by performing a bandwidth measurement.

In an embodiment of the present invention, since one of more of the many factors affecting a P2P network may be overlooked when estimating FT(bn), for instance churn and connectivity issues, a safety factor σ is introduced to delimit the available bandwidth for a selected group of peers to Urn=Urmax/σ, as to account for the aforementioned error factors.

By periodically contacting the tracker, each peer device keeps its random sample S of the overlay up-to-date. Samples are also exchanged among peers. The peer sampling may be based on previously known techniques such as NAT-resilient gossip algorithms. The tracker returns a uniform random sample of the nodes in the network, which is added to S. Each peer entry in it may contain: a peer identifier, the peer's NAT-type and the maximum upload capacity. This information is periodically refreshed and used as input in the overlay construction process.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

What is claimed is:

1. A method of distributing data content in a live streaming peer-to-peer (P2P) network comprising a plurality of peers and a streaming source periodically producing segments representing the data content to be distributed, wherein a group of the peers are assigned to download the data content from the streaming source and to distribute the downloaded data content to remaining peers in the P2P network, the method comprising the steps of:
   making repeated requests, from a first peer in the group to the streaming source, for a current segment produced by the streaming source, the requests being made at a rate higher than a rate with which the segments are produced by the streaming source;
   determining, by the first peer, whether the first peer is first in the group to download the current segment from the streaming source, wherein the first peer determines that it is first in the group to download the current segment upon receiving the current segment from the streaming source and determines that it is not first in the group to download the current segment upon receiving an announcement from a second peer in the group that the second peer has downloaded the current segment from the steaming source; and
   if the first peer is first in the group to download the current segment from the steaming source, announcing, by the first peer, that the current segment has been downloaded, wherein other peers in the group can download the current segment from the first peer;
   else if the first peer is not first in the group to download the current segment from the streaming source, downloading the current segment from the second peer in the group from which the announcement was received.

2. The method according to claim 1, further comprising: making a further request for a next current segment once said current segment has been downloaded.

3. The method of claim 1, further comprising:
   uploading the current segment to a requesting peer of the plurality of peers.

4. The method according to claim 1, the repeated requests of the first peer being made at a randomly set rate.

5. The method according to claim 1, wherein the group of peers assigned to download the data content from the streaming source and to distribute the downloaded data content to remaining peers in the P2P network have an upload capacity exceeding a predetermined threshold value.

6. The method according to claim 1, wherein in case multi-bitrate streaming is employed by the streaming source, the method further comprises:
   receiving an instruction to download data content having a particular bitrate.

7. The method according to claim 1, further comprising:
   reporting upload capacity to a network supervising device configured to arrange the plurality of peers in the P2P network on the basis of the reported upload capacity, wherein a peer having a higher upload capacity is arranged closer to the streaming source than a peer having a lower upload capacity.

8. A method of arranging peers in a live-streaming peer-to-peer (P2P) network comprising a plurality of peers, a network supervising device and a streaming source arranged to distribute data content, which streaming source periodically produces segments representing the data content to be distributed, the method comprising:
   assigning, by the network supervising device, a group of the peers to download the data content from the streaming source and to distribute the downloaded data content to remaining peers in the P2P network;
   instructing, by the network supervising device, each peer in the group of peers to make repeated requests to the streaming source for a current segment produced by the streaming source, the requests being made at a rate higher than a rate with which the segments are produced by the streaming source;
   determining, by a first peer, whether the first peer is first in the group to download the current segment from the streaming source, wherein the first peer determines that it is first in the group to download the current segment upon receiving the current segment from the streaming source and determines that it is not first in the group to download the current segment upon receiving an announcement from a second peer in the group that the second peer has downloaded the current segment from the steaming source;
   instructing, by the network supervising device, the first peer, being a first in the group to download the current segment, to announce on the P2P network that the current segment has been downloaded, wherein other peers in the group can download the current segment from the first peer, being the first in the group to download the current segment; and
   instructing, by the network supervising device, said other peers in the group to download the current segment from the first peer, being the first in the group to download the current segment.

9. The method according to claim 8, wherein the group of peers assigned to download the data content from the streaming source and to distribute the downloaded data content to remaining peers in the P2P network have an upload capacity exceeding a predetermined threshold value, while the remaining peers have an upload capacity not exceeding the predetermined threshold value.

10. The method according to claim 8, wherein in case multi-bitrate streaming is employed by the streaming source, the method comprising:
   separating, by the network supervising device, peers among said plurality of peers rendering data content at different bitrates into a plurality of overlays in the P2P network, each overlay comprising peers rendering data content at a particular bitrate.

11. The method according to claim 10, wherein the peers in the group assigned to download the data content from the streaming source are arranged in said group in each overlay regardless of the bitrate of their rendered data content.

12. The method according to claim 10, wherein the peers in the group assigned to download the data content from the streaming source are assigned to download the data content having the particular bitrate of the overlay in which the peers of the group are arranged.

13. The method according to claim 10, further comprising, for each overlay, starting with an overlay comprising peers rendering data content at a highest bitrate before moving on to an overlay comprising peers rendering data content at a next highest bitrate:
   selecting, by the network supervising device, a peer out of the plurality of peers having a highest upload capacity and assigning the selected peer to the group assigned to download the data content from the streaming source;

selecting, by the network supervising device, in order of upload capacity, one or more further peers out of the peers rendering data content at the particular bitrate of a currently selected overlay;

arranging, by the network supervising device, said one more further peers downstream of the group assigned to download the data content from the streaming source in the order of upload capacity, a number of peers among said one or more further peers being limited by a cumulative upload capacity of immediately preceding upstream peers, said one or more further peers being assigned to download the data content from the immediately preceding upstream peers, until all the peers of the currently selected overlay have been arranged.

14. The method according to claim 13, further comprising:

selecting, by the network supervising device, a peer out of the remaining peers for the currently selected overlay and assigning the selected peer to the group assigned to download the data content from the streaming source;

selecting, by the network supervising device, in order of upload capacity, one or more further peers out of the peers rendering data content at the particular bitrate of the currently selected overlay;

arranging, by the network supervising device, said one or more further peers downstream of the group assigned to download the data content from the streaming source in the order of upload capacity, a number of peers among said one or more further peers being limited by a cumulative upload capacity of immediately preceding upstream peers, said one or more further peers being assigned to download the data content from the upstream peers, until all the peers of the currently selected overlay have been arranged.

15. The method according to claim 8, further comprising:
acquiring, by the network supervising device, upload capacity of each peer to be arranged in the P2P network wherein a peer having a higher upload capacity is arranged closer to the streaming source than a peer having a lower upload capacity.

16. A peer device for distributing data content in a live streaming peer-to-peer (P2P) network comprising a plurality of peers and a streaming source periodically producing segments representing the data content to be distributed, wherein a group of the peers are assigned to download the data content from the streaming source and to distribute the downloaded data content to remaining peers in the P2P network, the peer device comprising a processing unit being arranged to:

make repeated requests to the streaming source for a current segment produced by the streaming source, the requests being made at a rate higher than a rate with which the segments are produced by the streaming source;

determine whether the peer device is first in the group to download the current segment from the streaming source, wherein the peer device determines that it is first in the group to download the current segment upon receiving the current segment from the streaming source and determines that it is not first in the group to download the current segment upon receiving an announcement from a second peer in the group that the second peer has downloaded the current segment from the steaming source; and if the peer device is in the group to download the current segment from the streaming source, announce that the current segment has been downloaded, wherein other peers in the group can download the current segment from the peer device;

else if the peer device is not first in the group to download the current segment from the streaming source, download the current segment from the second peer in the group from which the announcement was received.

17. The peer device according to claim 16, the processing unit further being arranged to:
make a further request for a next current segment once said current segment has been downloaded.

18. The peer device according to claim 16, the processing unit further being arranged to:
upload the current segment to a requesting peer of the plurality of peers.

19. The peer device according to claim 16, the processing unit further being arranged to:
make the repeated requests at a randomly set rate.

20. The peer device according to claim 17, wherein in case multi-bitrate streaming is employed by the streaming source, the processing unit further being arranged to:
download data content having a particular bitrate.

21. The peer device according to claim 17, the processing unit further being arranged to:
report upload capacity to a network supervising device configured to arrange the plurality of peers in the P2P network on the basis of the reported upload capacity.

22. A system for arranging peers in a live streaming peer-to-peer (P2P) network comprising a plurality of peers, a network supervising device, and a streaming source arranged to distribute data content, which streaming source periodically produces segments representing the data content to be distributed, the system, comprising a plurality of processing units, being arranged to:

assign, by a processing unit of the network supervising device, a group of the peers to download the data content from the streaming source and to distribute the downloaded data content to remaining peers in the P2P network;

instruct, by the processing unit of the network supervising device, each peer in the group of peers to make repeated requests to the streaming source for a current segment produced by the streaming source, the requests being made at a rate higher than a rate with which the segments are produced by the streaming source;

determine, by a processing unit of a first peer, whether the first peer is first in the group to download the current segment from the streaming source, wherein the first peer determines that it is first in the group to download the current segment upon receiving the current segment from the streaming source and determines that it is not first in the group to download the current segment upon receiving an announcement from a second peer in the group that the second peer has downloaded the current segment from the steaming source;

instruct, by the processing unit of the network supervising device, the first peer, being a first in the group to download the current segment, to announce on the P2P network that the current segment has been downloaded, wherein other peers in the group can download the current segment from the first peer, being the first in the group to download the current segment; and instruct, by the processing unit of the network supervising device, said other peers in the group to download the current segment from the first peer, being the first in the group to download the current segment.

23. The system according to claim 22, wherein the group of peers assigned to download the data content from the streaming source and to distribute the downloaded data content to remaining peers in the P2P network have an upload capacity exceeding a predetermined threshold value, while the remaining peers have an upload capacity not exceeding the predetermined threshold value.

24. The system according to claim 22, wherein in case multi-bitrate streaming is employed by the streaming source, the system further is arranged to:
    separate, by the processing unit of the network supervising device, peers among said plurality of peers rendering data content at different bitrates into a plurality of overlays in the P2P network, each overlay comprising peers rendering data content at a particular bitrate.

25. The system according to claim 24, wherein the system further is arranged to:
    arrange, by the unit of the network supervising device, the peers in the group assigned to download the data content from the streaming source in said group in each overlay regardless of the bitrate of their rendered data content.

26. The system according to claim 24, wherein the peers in the group assigned to download the data content from the streaming source are assigned to download the data content having the particular bitrate of the overlay in which the peers of the group are arranged.

27. The system according to claim 24, the system further being arranged to, for each overlay, starting with an overlay comprising peers rendering data content at a highest bitrate before moving on to an overlay comprising peers rendering data content at a next highest bitrate:
    select, by the processing unit of the network supervising device, a peer out of the plurality of peers having a highest upload capacity and assigning the selected peer to the group assigned to download the data content from the streaming source;
    select, by the processing unit of the network supervising device, in order of upload capacity, one or more further peers out of the peers rendering data content at the particular bitrate of a currently selected overlay; and
    arrange, by the processing unit of the network supervising device, said one or more further peers downstream of the group assigned to download the data content from the streaming source in the order of upload capacity, a number of peers among said one or more further peers being limited by a cumulative upload capacity of immediately preceding upstream peers, said one or more further peers being assigned to download the data content from the immediately preceding upstream peers, until all the peers of the currently selected overlay have been arranged.

28. The system according to claim 22, the system being arranged to:
    acquire, by the processing unit of the network supervising device, upload capacity of each peer to be arranged in the P2P network wherein a peer having a higher upload capacity is arranged closer to the streaming source than a peer having a lower upload capacity.

29. A non-transitory computer readable medium, the computer readable medium having processor-executable instructions stored thereon, which, when executed by at least one processing unit, will cause the at least one processing unit to perform a method of distributing data content in a live-streaming peer-to-peer (P2P) network comprising a plurality of peers and a streaming source periodically producing segments representing the data content to be distributed, wherein a group of the peers are assigned to download the data content from the streaming source and to distribute the downloaded data content to remaining peers in the P2P network, the method comprising the steps of:
    making repeated requests, from a first peer in the group to the streaming source, for a current segment produced by the streaming source, the requests being made at a rate higher than a rate with which the segments are produced by the streaming source;
    determining, by the first peer, whether the first peer is first in the group to download the current segment from the streaming source, wherein the first peer determines that it is first in the group to download the current segment upon receiving the current segment from the streaming source and determines that it is not first in the group to download the current segment upon receiving an announcement from a second peer in the group that the second peer has downloaded the current segment from the steaming source; and
    if the first peer is first in the group to download the current segment from the streaming source, announcing, by the first peer, that the current segment has been downloaded, wherein other peers in the group can download the current segment from the first peer;
    else if the first peer is not first in the group to download the current segment from the streaming source, downloading the current segment from the second peer in the group from which the announcement was received.

30. A system comprising a first non-transitory computer readable medium and a second non-transitory computer readable medium, the first computer readable medium having first processor-executable instructions stored thereon, which when executed by at least a first processing unit of a network supervising device, will cause the at least first processing unit to perform at least a first part of a method of arranging peers in a live-streaming peer-to-peer (P2P) network comprising a plurality of peers, the network supervising device and a streaming source arranged to distribute data content, which streaming source periodically produces segments representing the data content to be distributed, and the second computer readable medium having second processor-executable instructions stored thereon, which when executed by at least a second processing unit of a first peer, will cause the at least second processing unit to perform at least a second part of the method, the method comprising:
    assigning, by the network supervising device, a group of the peers to download the data content from the streaming source and to distribute the downloaded data content to remaining peers in the P2P network;
    instructing, by the network supervising device, each peer in the group of peers to make repeated requests to the streaming source for a current segment produced by the streaming source, the requests being made at a rate higher than a rate with which the segments are produced by the streaming source;
    determining, by the first peer, whether the first peer is first in the group to download the current segment from the streaming source, wherein the first peer determines that it is first in the group to download the current segment upon receiving the current segment from the streaming source and determines that it is not first in the group to download the current segment upon receiving an announcement from a second peer in the group that the second peer has downloaded the current segment from the steaming source;
    instructing, by the network supervising device, the first peer, being a first in the group to download the current segment, to announce on the P2P network that the current segment has been downloaded, wherein other peers in the group can download the current segment from the first peer, being the first in the group to download the current segment; and instructing, by the network supervising device, said other peers in the group to download the current segment from the first peer, being the first in the group to download the current segment.

31. The non-transitory computer readable medium of claim 29, further comprising:

making a further request for a next current segment once said current segment has been downloaded.

32. The system of claim 30, wherein the group of peers assigned to download the data content from the streaming source and to distribute the downloaded data content to remaining peers in the P2P network have an upload capacity exceeding a predetermined threshold value, while the remaining peers have an upload capacity not exceeding the predetermined threshold value.

* * * * *